US010990909B2

(12) United States Patent
Greenberger et al.

(10) Patent No.: US 10,990,909 B2
(45) Date of Patent: Apr. 27, 2021

(54) PREDICTING RESOURCE AVAILABILITY BASED ON USER PROFILE DATA

(71) Applicant: INTERNATIONAL BUSINESS MACHINES CORPORATION, Armonk, NY (US)

(72) Inventors: Jeremy A. Greenberger, San Jose, CA (US); Zachary M. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 15/864,191

(22) Filed: Jan. 8, 2018

(65) Prior Publication Data

US 2019/0213506 A1    Jul. 11, 2019

(51) Int. Cl.
*G06Q 10/06* (2012.01)
*G06Q 10/02* (2012.01)
*G06Q 50/12* (2012.01)
*H04L 29/08* (2006.01)
*G08B 5/22* (2006.01)

(52) U.S. Cl.
CPC ....... *G06Q 10/02* (2013.01); *G06Q 10/06312* (2013.01); *G06Q 50/12* (2013.01); *G08B 5/221* (2013.01); *H04L 67/22* (2013.01)

(58) Field of Classification Search
CPC .. G06Q 10/02; G06Q 10/06312; G06Q 50/12; G08B 5/221; H04L 67/22
See application file for complete search history.

(56) References Cited

U.S. PATENT DOCUMENTS

| | | | |
|---|---|---|---|
| 8,472,979 B2 | 6/2013 | Dingler et al. | |
| 9,317,882 B2 | 4/2016 | Bosko et al. | |
| 2005/0086117 A1* | 4/2005 | Kanisawa | G06Q 10/0637 705/7.36 |
| 2007/0250355 A1 | 10/2007 | Leet et al. | |

(Continued)

FOREIGN PATENT DOCUMENTS

WO    2014097222    6/2014

OTHER PUBLICATIONS

Hernandez, Javier et al.; Measuring the Engagement Level of TV Viewers; 2013 10th IEEE International Conference and Workshops on Automatic Face and Gesture Recognition; Apr. 2013; 7 pages.

*Primary Examiner* — Paul Danneman
(74) *Attorney, Agent, or Firm* — Schmeiser, Olsen & Watts, LLP; Stephanie Carusillo

(57) ABSTRACT

Embodiments of the present invention relate to a method of predicting resource availability in a given time period by leveraging profile data associated with one or more users. The method includes analyzing historical use of a resource by the one or more users based on information included in records respectively associated with each user of the one or more of users. The method includes determining, based on the analysis, that one or more factors are likely predictors of use of the resource by the one or more users. The method includes predicting that there is a statistical likelihood that the one or more users will use the resource during a period of time, responsive to the determining of the one or more factors. The method includes sending, to a venue, a notification that indicates likely use of the resource by the at least one user during the given time period.

12 Claims, 9 Drawing Sheets

(56) References Cited

U.S. PATENT DOCUMENTS

| | | | |
|---|---|---|---|
| 2013/0090959 A1* | 4/2013 | Kvamme | G06Q 10/02 |
| | | | 705/5 |
| 2014/0244324 A1 | 8/2014 | Ford et al. | |
| 2014/0365264 A1 | 12/2014 | Smiley et al. | |
| 2015/0194039 A1* | 7/2015 | Martin | H04W 72/0453 |
| | | | 340/632 |
| 2015/0242944 A1* | 8/2015 | Willard | G06Q 30/0645 |
| | | | 705/5 |
| 2015/0269150 A1 | 9/2015 | Carper et al. | |
| 2015/0371317 A1* | 12/2015 | Bosko | H04W 4/70 |
| | | | 705/15 |
| 2016/0117612 A1 | 4/2016 | Hong et al. | |
| 2016/0134932 A1* | 5/2016 | Karp | H04W 4/80 |
| | | | 348/155 |
| 2016/0162478 A1 | 6/2016 | Blassin et al. | |
| 2018/0096440 A1* | 4/2018 | Lopez | G06Q 30/0226 |

\* cited by examiner

PREDICTING RESOURCE AVAILABILITY BASED ON USER PROFILE DATA

TECHNICAL FIELD

The present invention relates predicting resource availability by leveraging profile data of one or more users.

BACKGROUND

Restaurants and sports bars are popular venues for watching sporting events. However, it is very difficult for these venues to estimate the turnover time for tables during events in order to maximize reservations and fill capacity. A sports bar that may have an average turnover time of 45 minutes in a given night, may have an adjusted turnover time of two hours on high profiled sporting event days. There is a long felt need to overcome these challenges.

SUMMARY

Embodiments of the present invention relate to a method of predicting resource availability in a given time period by leveraging profile data associated with one or more users, and associated computer system and computer program product. The method includes analyzing historical use of a resource by the one or more users based on information included in records respectively associated with each user of the one or more of users. The method includes determining, based on the analyzing, that one or more factors are likely predictors of use of the resource by the one or more users. The method includes predicting that there is a statistical likelihood that the one or more users will use the resource during a given time period, responsive to the determining of the one or more factors. The method includes sending, to a venue, a notification that indicates likely use of the resource by the at least one user during the given time period.

DETAILED DESCRIPTION

Figure 1:
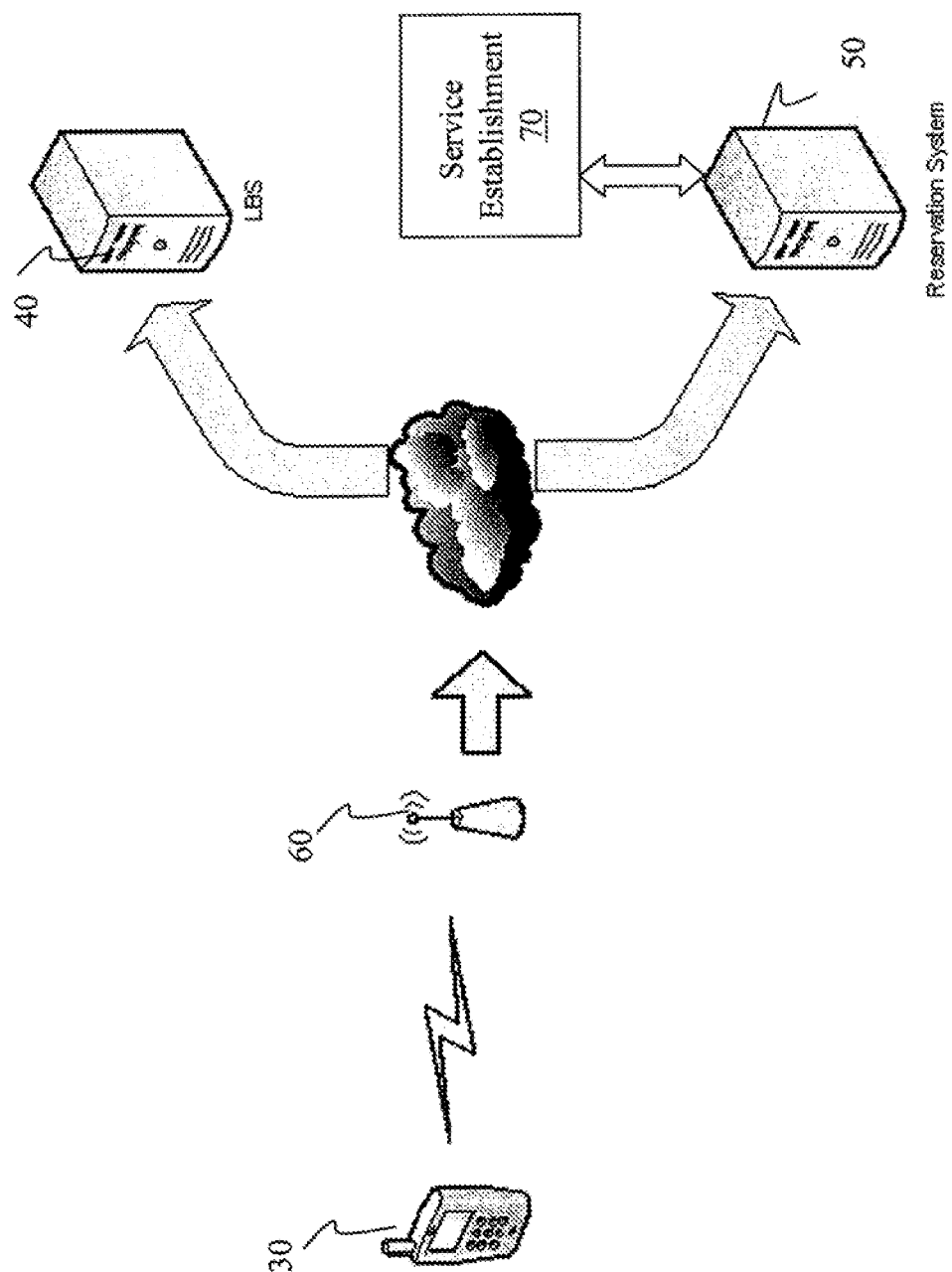
FIG. 1 illustrates an example schematic architecture, in accordance with embodiments of the present invention.

Embodiments of the present invention relate to systems that determine the wait time for a restaurant reservation relative to sporting events or other events. Embodiments relate to the aggregation of location and/or location-related metadata to build context that can be used for analysis and resulting actions and/or management decisions. Embodiments relate to the identification of events, attributes or patterns of behavior through video analysis of monitored environments. Embodiments relate to providing venues with better reservation wait time estimation.

Embodiments relate to a method performed by one or more processors of predicting resource availability by leveraging profile data associated with one or more users to predict availability of a resource in a given time period. In embodiments, the method may include: analyzing historical use of the resource by the one or more users based on information included in records respectively associated with each user of the one or more of users; determining, based on the analysis, that one or more factors are likely predictors of use of the resource by the one or more users; responsive to the determining of the one or more factors, predicting that there is a statistical likelihood that the one or more users will use the resource during a given time period; and/or sending, to a venue, a notification that indicates likely use of the resource by the at least one user during the given time period.

In embodiments, the resource is a service. The service may be a hospitality service. The hospitality service may be one of: hospitality services associated with sporting events; hospitality services associated with live events; and/or hospitality services associated with broadcast events. In embodiments, the service may be a medical service, an accounting service, a legal service; a technical service; a delivery service, and/or a transportation service. In embodiments, the resource is a material item.

In embodiments, leveraging profile data may include: predicting availability of hospitality services at the venue; establishing pricing for hospitality services at the venue; adjusting advertising expenditures for the venue; adjusting human resource allocation at the venue; and/or conducting business analytics.

In embodiments, the profile data may include: the location of the one or more users; the location of the one or more users; the social media data of the one or more users; the purchase history of the one or more users; the entertainment preferences of the one or more users; the sports team preference of the one or more users; the associations of the one or more users; the food preferences of the one or more users; and/or the beverage preferences of the one or more users.

In embodiments, the analyzing is at least one of: artificial intelligence analysis; trend analysis; and/or financial analysis.

In embodiments, the determining that one or more factors are likely predictors of use of the resource by the one or more users is based on one or more static threshold values. In embodiments, the determining that one or more factors are likely predictors of use of the resource by the one or more users is based on one or more dynamic threshold values. In embodiments, the one or more dynamic threshold values may be established by at least one of artificial intelligence and/or a deep learning algorithm.

In embodiments, the venue, in response to the notification, may make one or more management decisions for the venue. The one ore more management decisions may include: allocating human resources; advertising to the one or more users; adjusting pricing; determining which events or combinations or events to broadcast at the venue; and/or determining which sporting events or combinations or sporting events to broadcast at the venue.

Embodiments may be implemented at least partially in conjunction with a cloud computing system.

In embodiments, the analyzing may include aggregating metadata to build context that can be used the determining and the predicting. The metadata may be location related metadata.

In embodiments, the profile data may be: identification of events; attributes acquired through video analysis of an environment; and/or patterns of behavior acquired through video analysis of the venue.

For example, a venue (e.g. sports bar) may be outfitted with a monitoring system (e.g. an IBM Presence Insights/video analytics system). A person/collection of customers may visit the venue as usual during a night with many sporting events being shown. Restaurant host/hostess would see that the restaurant has no open tables and may then notify the customers that there is a wait. In embodiments, a system may determine and/or estimate the wait time for the tables that fit the size for the party. The system may provide the host/hostess the lowest estimated wait time for the number of people in the party.

Embodiments relate to how the system would determine wait time. The system may go through each table that fits the party size. The system may identify the people at the table. Once people are identified, the system may capture historical visit/order information. For example, the system may have captured what certain customers ordered in the past and when that occurred. The system may have captured if the customers were just ordering drinks or also ordering food.

In embodiments, the system may determine the likes and/or trends of the identified customers. For example, if identified customers like to watch basketball, then this customer preference may be captured in their profile. If an identified customer is a frequent visitor when Duke University games are shown, then then this customer preference may also be captured in their profile.

In embodiments, the system may captures current information and/or context of the location. For example, the system may capture a customer's habits on Sunday night at 6:30 p.m. in New York, N.Y. noting profile information that may be used to predict future behavior. In embodiments, the system may capture current information and/or context of the shown games. In this example, if Miami Heat vs. New York Knicks are playing at 7:00 p.m. on the television above the bar, then the system may capture this information about the different sporting events being play may be used in order to predict trends of customers and estimate table turnover times based on sporting event related preferences of the customers whose profile information was captured in the system. For example, in embodiments, the system may capture estimated time left on the games that apply to the table. From this information about different sporting events (as an example embodiment), the system may estimate the time left of watched games to that table and the estimated turnover time of the table. From the estimated turnover time of the venue estimated with optimized accuracy, a venue may be able to better serve customers and/or maximize profit.

Embodiments may be able to estimate what a customer likes to watch by their historical visits to a venue. By leveraging previously captured information about the customer, embodiments relate to acquiring a more accurate information as to what a customer likes to watch. In embodiments, a venue may need to specify locations of televisions tracking what is being played on the televisions in venue in order to predict and/or deduce the viewing habits of a customer.

FIG. 1 illustrates an example schematic architecture of embodiments of the present invention. In embodiments, a mobile device 30 and a location based service 40 subscribe to a reservation service or system 50. In embodiments, a service establishment 70 also subscribes to the services of the reservation system 50. The subscription can take on many different forms such as, for example, subscription, one time usage fee, periodic fee, etc. The service establishment 70 can be any service oriented venue such as, for example, a restaurant, but is equally applicable to other service venues such as theaters, sporting venues and other establishments which cater to patrons. In embodiments, the mobile device 30 may also subscribe to the location based service 40.

The mobile device 30 may connect to the reservation system 50 via the Internet using instant messaging or other communication protocols. The location based service 40 and service establishment 70 can connect with the reservation system 50 via the Internet or other wired and/or wireless links; any combination of one or more types of networks (e.g., the Internet, a wide area network, a local area network, a virtual private network, etc.); and/or utilize any combination of transmission techniques and protocols.

Once subscribed, the reservation system 30 can receive location information of an end user (mobile device) 30 from the location based service 40. Once the location and/or route of the mobile device 30 is known, the reservation system 50 can provide an anticipated arrival time of the patron to the service establishment 70, e.g., restaurant. In embodiments, the service establishment 70 can more efficiently utilize its resources. In embodiments, the service establishment can calculate a new guest reservation queue in order to more efficiently serve its patrons. Embodiments may be used to provide priority, for example, to early arriving patrons, knowing that other patrons are being delayed or have canceled their reservations or make other types of adjustments, provide reminders or alerts to early and late arriving patrons, or adjust a user's priority if they are already at the location. This priority can be provided regardless of prearranged reservations of any of the patrons. In embodiments, some venue environments (e.g. sports bars) the reservation system 30 calculates turnover of resources based on captured habits of customers (e.g. a group of customers are fans of the New York Yankees and is watching the game which ends at 10:00 p.m. at table #1). In embodiments, reservation system 50 may be able to allocate resources of service establishment 70 in an optimized manner.

In embodiments, the reservation system 50 may proactively broadcast messages to potential patrons passing with a predefined zone of the service establishment. Embodiments may include determining a users location and checking service establishments with available resources (e.g. restaurants with open reservations). Once the location is determined and certain accommodations are known to be available, the broadcast message may be sent to the mobile devices within a certain radius (e.g. 5 miles) of the service establishment 70. In response, the patron (e.g. mobile device 30) may send a seating request before entering the service establishment 70 therefore reserving a seat before actually entering into the establishment 70.

Figure 2:
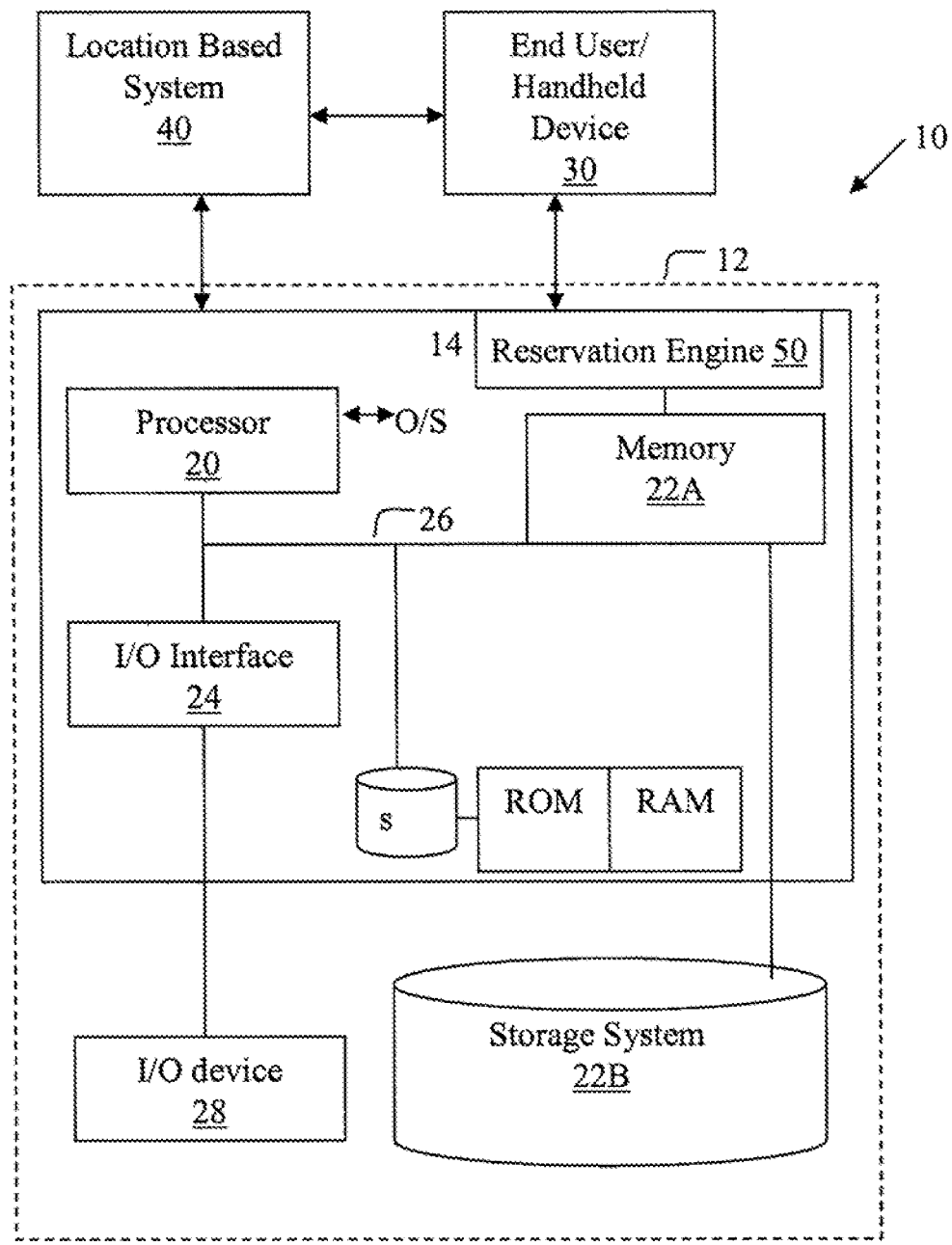
FIG. 2 illustrates an example environment for managing processes, in accordance with embodiments of the present invention.

FIG. 2 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 2).

The computing device 14 includes a reservation engine (module or program control) 50 configured to make computing device 14 operable to perform the services described herein. In one example, both the mobile device 30 and the location based service 40 subscribe to the reservation services (reservation engine 50). In embodiments, it should be understood that the location based service can also be part of the computing device 14 and, as such, both services can be provided by, e.g., a network carrier or other service provider. Once subscribed, the mobile device 30 may connect to the reservation engine 50 and more specifically to the computing device 14 via a communication network and/or connection. The reservation engine 50 may receive location information of the mobile device 30 from the location based service 40 and, in turn, be provided with information such as, for example, anticipated arrival time of the patron, location of the patron, any delays the patron is encountering, etc. Embodiment may allow the service establishment 70 to prioritize or adjust its reservation queue. In embodiments, the reservation engine 50 may proactively send broadcast messages to potential patrons passing with a predefined zone of the service establishment 70.

In embodiments, the computing device 14 may include a processor 20, a memory 22A, an I/O interface 24, and a bus 26. The computing device 14 may be in communication with the external I/O device/resource 28 and/or the storage system 22B.

Figure 3:
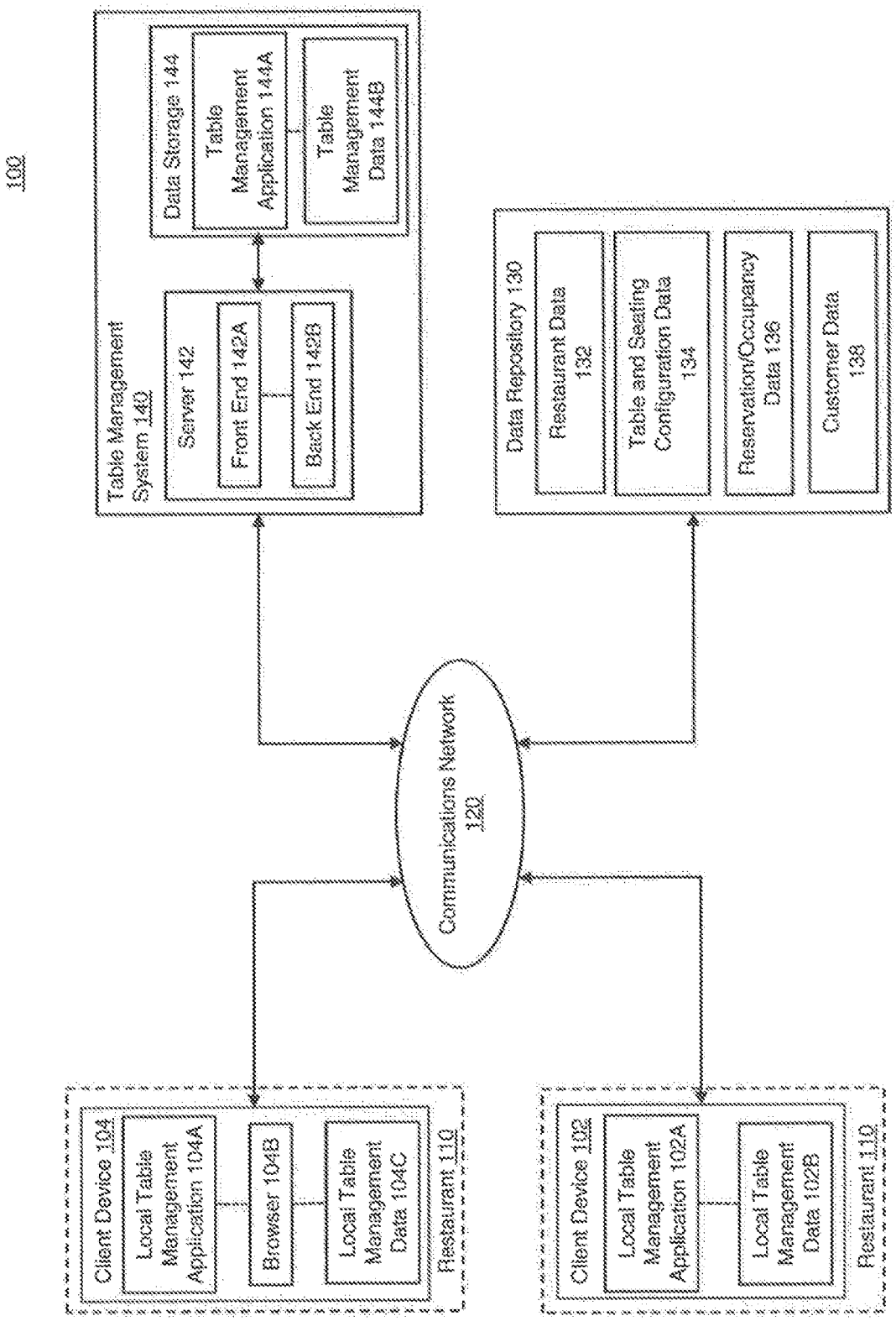
FIG. 3 illustrates an example environment that includes a communications network that interconnects client devices, a data repository, and a table management system, in accordance with embodiments of the present invention.

In FIG. 3, environment 100 includes a communications network 120 that interconnects client devices 102 and 104, a data repository 130, and a table management system 140, in accordance with embodiments. In embodiments, a user of client device 102 may execute a native application (e.g., local table management application 102A) to provide table and seating management services to restaurant 110. In embodiments, a user of client device 104 may provide similar table and seating management services to restaurant 110 by executing local table management application 104A through an instance of a web browser 104B.

In embodiments, local table management applications 102A and 104A may leverage locally stored restaurant data, table/seating configuration data, reservation data, and customer data to provide table and seating management services to restaurant 110. In embodiments, local table management applications 102A and 104A may leverage local table management data 102B and 104C stored on corresponding client devices 102 and 104 to provide the disclosed table and seating management services. In other aspects, however, local table management applications 102A and 104A may exchange information with data repository 130 and/or a table management application executed by table management system 140 (e.g., table management application 144A) through calls to corresponding application programming interfaces (APIs).

Data repository 130 may include one or more data storages configured to store information, in accordance with embodiments. For example, in embodiments, data repository 130 may include restaurant data 132, table and seating configuration data 134, reservation/occupancy data 136, and customer data 138. In embodiments, table management system 140 and client devices 102 and 104 may leverage restaurant data 132, table and seating configuration data 134, existing reservation data 136, and customer data 138 to perform table management and allocation processes.

In embodiments, restaurant data 132 may include information identifying one or more restaurants, and further, information identifying one or more table management parameters. For example, restaurant data 134 may include information identifying restaurant 110 (e.g., a name), information identifying characteristics of restaurant 110 (e.g., a type of cuisine or a noise level within restaurant 110), and street addresses and contact information for restaurant 110. Further, in certain aspects, restaurant data 144 may also include one or more table management parameters for restaurant 110. Table management parameters consistent with the disclosed embodiments include, but are not limited to, a mode for allocating tables and seats (e.g. a manual or automated slotting mode), rate-limiting parameters, server shift data, and periods during which restaurant 110 is closed or otherwise unavailable for reservation. Further, restaurant data 132 may also include historical data indicating turnaround times for parties of various sizes over corresponding periods (e.g., one month, six months, or one year). In embodiments, turnaround time for parties may be determined by analyzing profile data of customers (e.g. sports fans at a sports bar) in order to optimally estimate turnaround times for tables seated in certain situations (e.g. the broadcast of a live sporting event).

Table and seating configuration data 134 may, in certain embodiments, include information identifying current table and seating configurations within the various seating areas of the one or more restaurants. By way of example, for restaurant 110, table and seating configuration data 134 may include informational allowing client device 102 and 104 to render and present a graphical representation of a layout of tables within a corresponding seating area, and further, a configuration of seats at each of the tables (e.g., a corresponding restaurant floor plan). Further, in certain aspects, restaurant 110 may have multiple seating areas (e.g., indoor areas configured for smaller tables and larger tables, and an outdoor patio area suitable for use in warmer months). In some embodiments, table and seating configuration data 134 may include information identifying layouts of tables and corresponding seating configurations for each of the multiple seating areas.

In embodiments, habits (e.g. profile data) of customers may be deduced for capturing environments. For example, the profile data (e.g. preferred sports team) of a customer may be the result of a pattern of television broadcast screens historically near the customer's table.

Table management system 140 may include one or more computer systems and servers configured to process and store information, and execute software instructions to perform one or more table management processes consistent with the disclosed embodiments. In certain aspects, table management system 140 may include a server 142 (e.g., a "table management server") and a data storage 144. Table management server 142 may include a front end 142A, and a back end 142B, which is disposed in communication with front end 142A.

Data storage 144 may include one or more data storage devices configured to store information consistent with the disclosed embodiments. In embodiments, local data repository 144 may include a table management application 144A and table management data 144B. Table management server 142 may, in embodiments, access table management data 144B and execute table management application 144A to provide table management services to one or more restaurants (e.g. restaurant 110).

Figure 4:
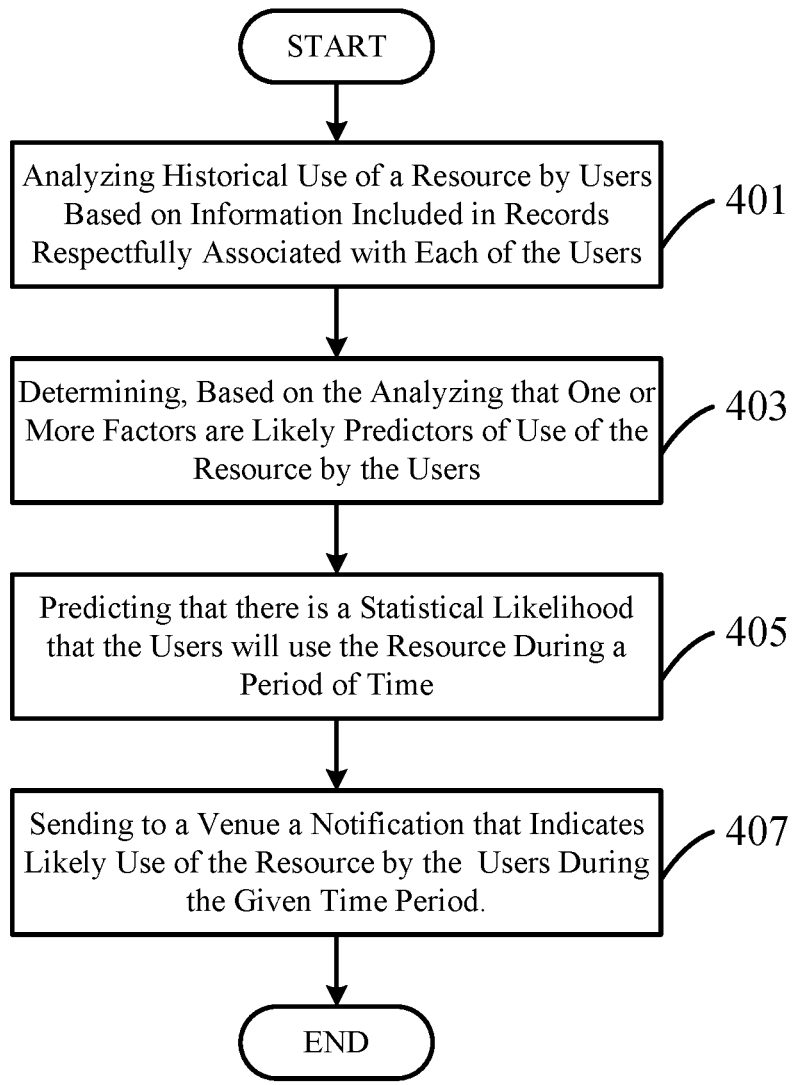
FIG. 4 illustrates an example process that predicts by estimation the anticipated use of a resource, in accordance with embodiments of the present invention.

FIG. 4 illustrates an example process that predicts by estimation the anticipated use of a resource, in accordance with embodiments of the present invention. In step 401, the process includes analyzing historical use of a resource by a plurality of users based on information included in records respectively associate with each user of the plurality of users. In step 403, the process includes determining, based on the analyzing, that one or more factors are likely predictors of use of the resource by the users. In step 405, the process includes predicting that there is a statistical likelihood that the users will use the resource during a given time period. In step 407, the process includes sending a venue a notification that indicates likely use of the resource by the users during the given time period.

Figure 5:
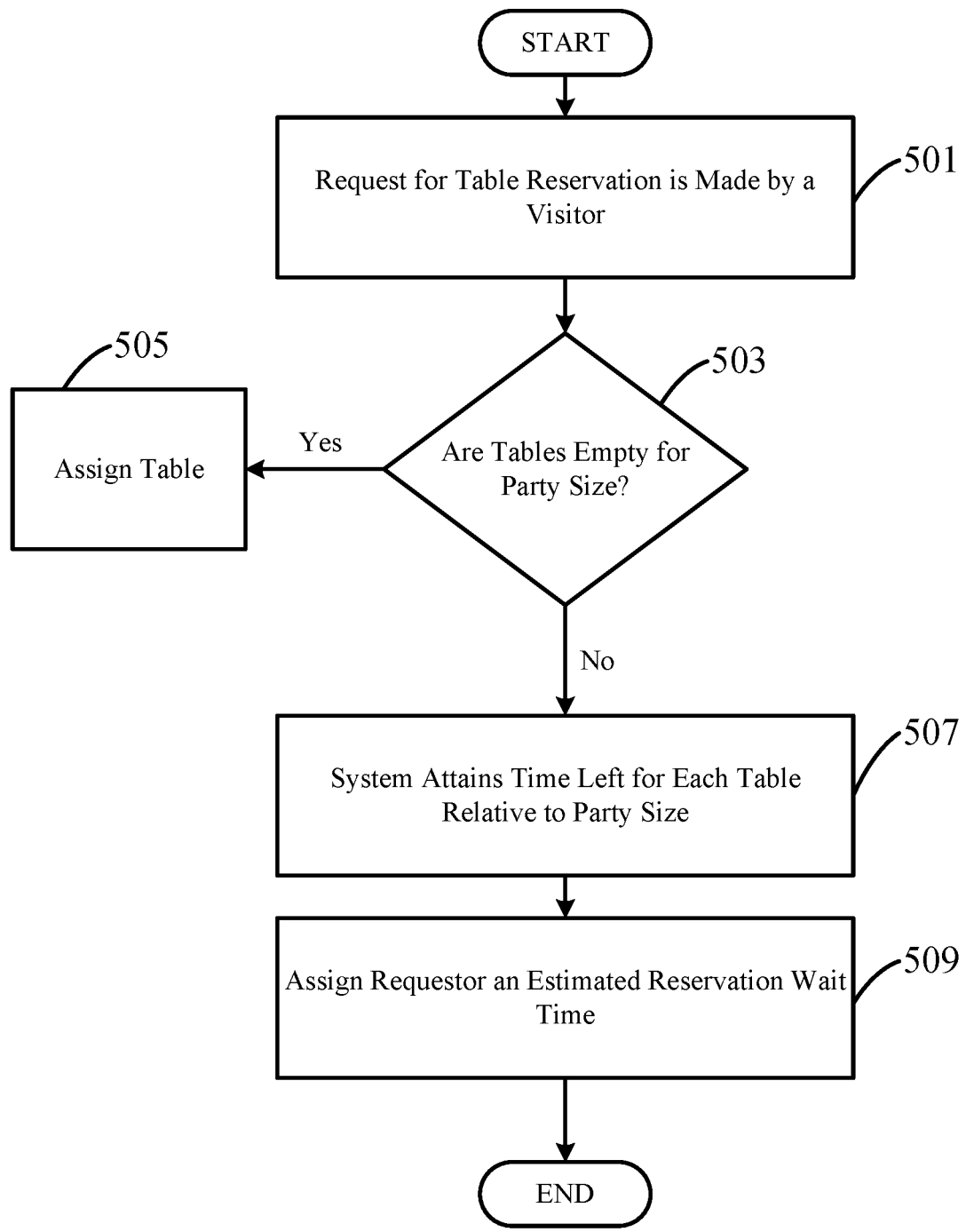
FIG. 5 illustrates an example process for making a table reservation, in accordance with embodiments of the present invention.

FIG. 5 illustrates an example process for making a table reservation, in accordance with embodiments of the present invention. In step 501, a request may be made for a table reservation by a visitor. In decision block 503, in response to the request in step 501, it may be determined if there are tables available (e.g. a resource) of an establishment. If tables are available, then decision block 503 leads to step 505 which assigns a table to a customer and ends the process. If tables are not available, then decision block 503 leads to step 507 where the system estimates the time left for each table relative to party size. Since customer's habits may be unpredictable (especially in a sports bar), estimating the turnover of each of the tables may be optimized by correlating the habits (e.g. a New York Yankees fan) with the scenario I the environment (e.g. the Yankees are playing on the television in the sports bar until around 10:00 p.m.). In step 509, a requester of a table may be assigned an estimated reservation wait time, which is at least partially calculated based on an analysis of the habits of customers already occupying tables.

Figure 6:
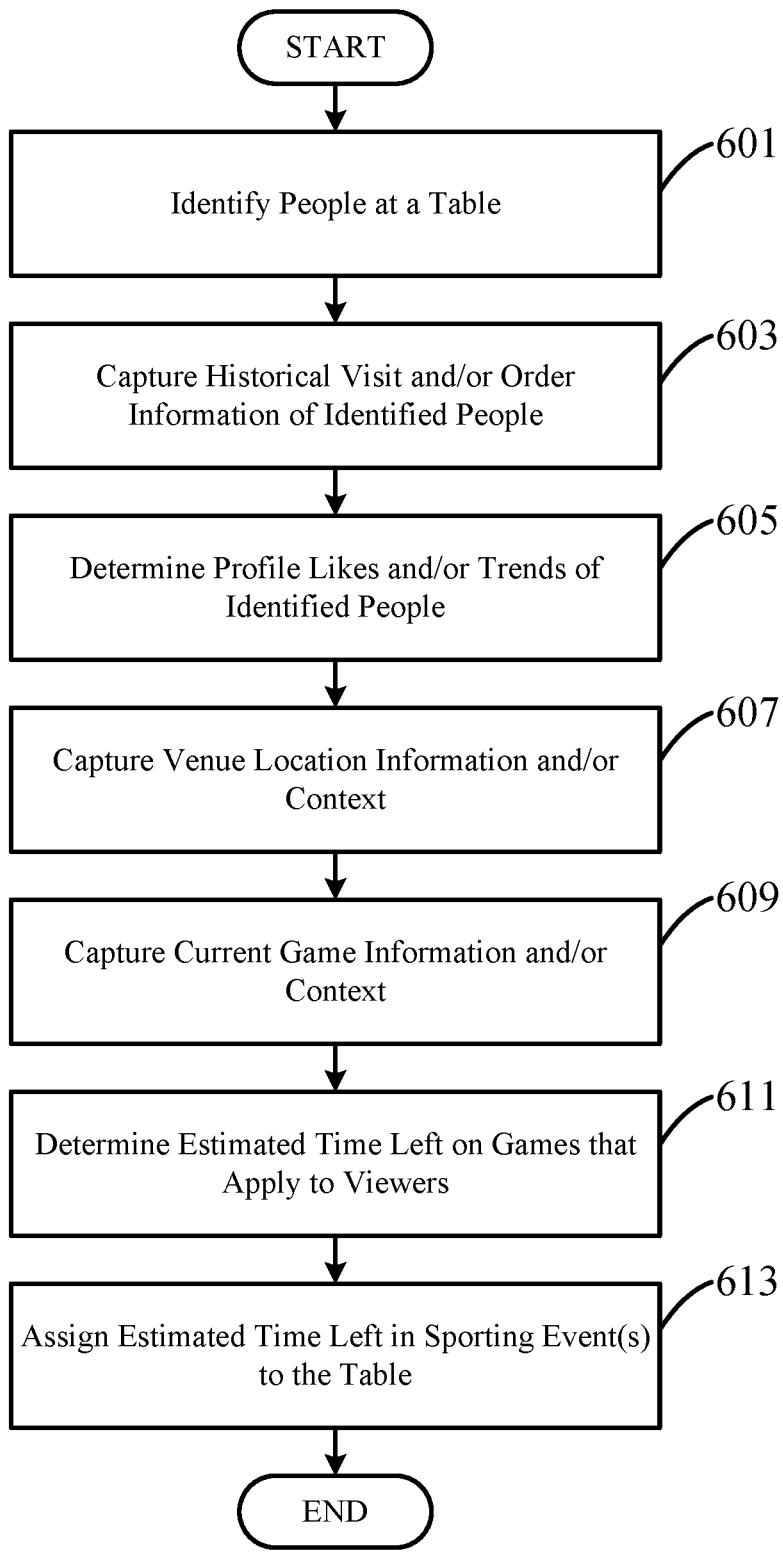
FIG. 6 illustrates an example process of estimating resource turnover based on a sporting event, in accordance with embodiments of the present invention.

FIG. 6 illustrates an example process of estimating resource turnover based on a sporting event, in accordance with embodiments of the present invention. In step 601, a process may identify people currently sitting at a table (e.g. at a sports bar) in order to estimate the turnover time of that table. In step 603, the process may capture historical visit and/or order information of the identified people. In step 605, the process may determine profile likes and/or trends of identified people (e.g. which sports team the people are fans of). In step 607, the process may capture venue location information and/or context information. In step 609, the process may capture current game information and/or context (e.g. teams and/or game times etc.). In step 611, the process may determine estimated time left on games that apply to viewers (e.g. predict what the people currently sitting at the table are watching and when that broadcast will be over). In step 613, the process assigns estimated time left in sporting vents to the table, in order for the system to estimate the turnaround time for a waiting customer.

Figure 7:
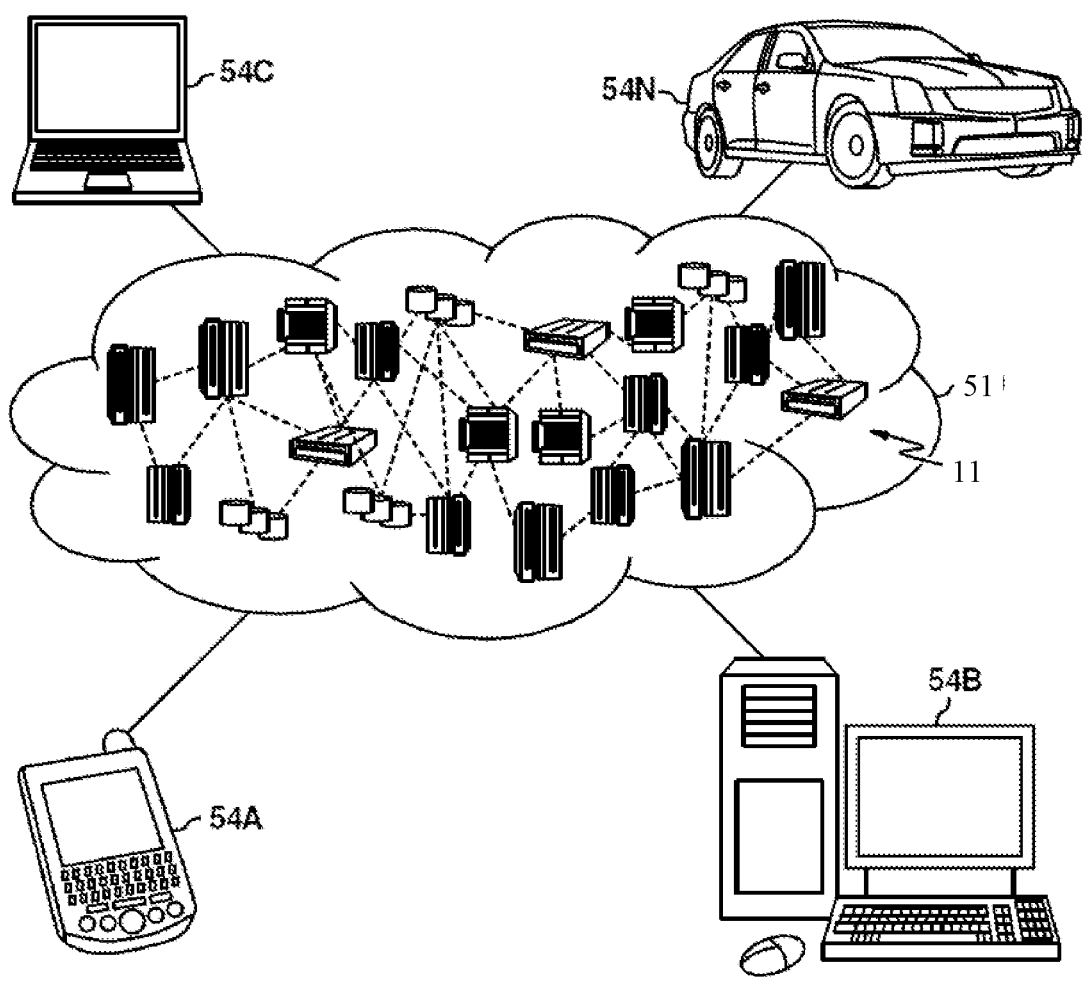
FIG. 7 depicts a cloud computing environment according to embodiments of the present invention.

FIG. 7 depicts a cloud computing environment according to embodiments of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
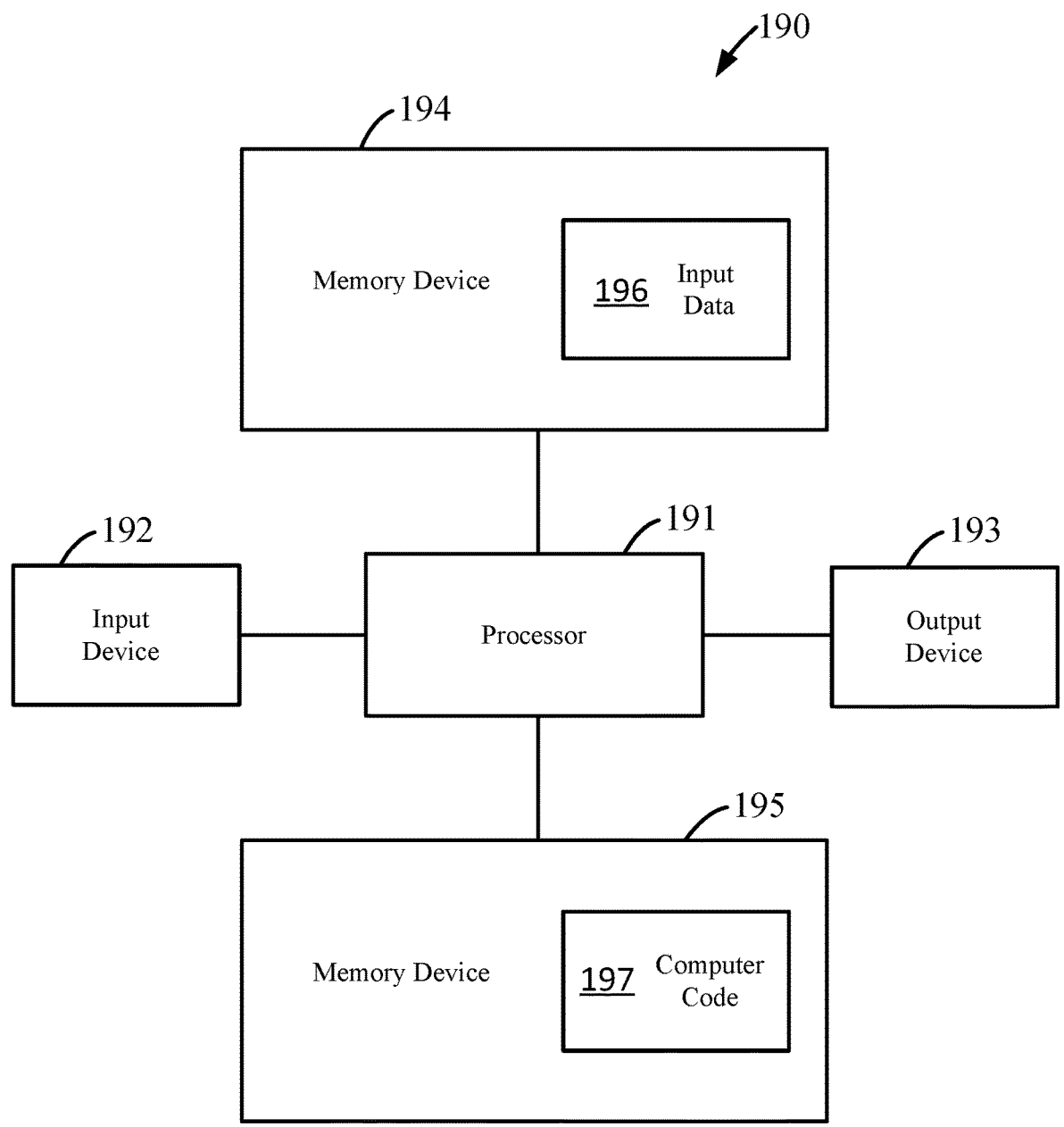
FIG. 9 illustrates a computer system used for implementing the methods associated with embodiments of the present invention.

Referring now to FIG. 7, illustrative cloud computing environment 51 is depicted. As shown, cloud computing environment 51 includes one or more cloud computing nodes 11 with which local computing devices used by cloud consumers, such as, for example, personal digital assistant (PDA) or cellular telephone 54A, desktop computer 54B, laptop computer 54C, and/or automobile computer system 54N may communicate. Nodes 11 may communicate with one another. They may be grouped (not shown) physically or virtually, in one or more networks, such as Private, Community, Public, or Hybrid clouds as described hereinabove, or a combination thereof. This allows cloud computing environment 51 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 51 can communicate with any type of computerized device over any type of network and/or network addressable connection (e.g., using a web browser).

Figure 8:
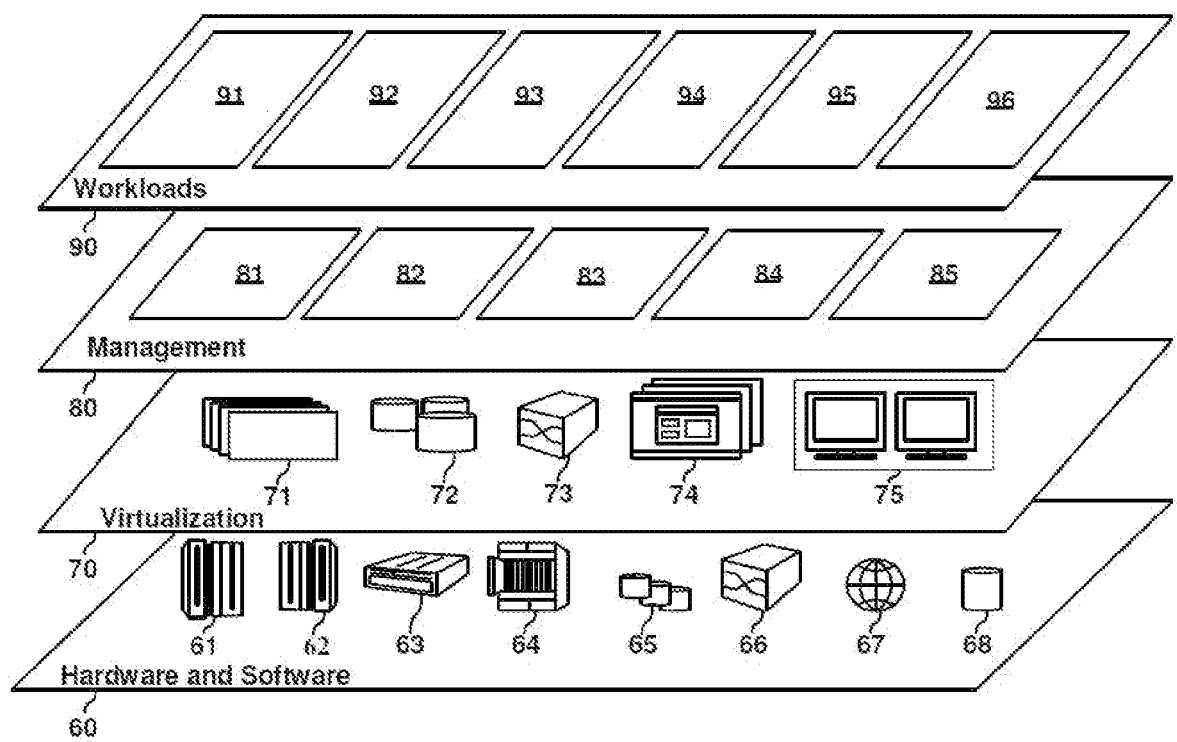
FIG. 8 depicts abstraction model layers according to embodiments of the present invention.

Referring now to FIG. 8, a set of functional abstraction layers provided by cloud computing environment 51 (FIG. 7) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predicting resource availability by leveraging profile data associated with one or more users to predict availability of a resource in a given time period 96.

FIG. 9 illustrates a computer system 190 used for implementing the methods of the present invention. The computer system 190 includes a processor 191, an input device 192 coupled to the processor 191, an output device 193 coupled to the processor 191, and memory devices 194 and 195 each coupled to the processor 191. The input device 192 may be, inter alia, a keyboard, a mouse, etc. The output device 193 may be, inter alia, a printer, a plotter, a computer screen, a magnetic tape, a removable hard disk, a floppy disk, etc. The memory devices 194 and 195 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 195 includes a computer code 197 which is a computer program that includes computer-executable instructions. The computer code 197 includes software or program instructions that may implement an algorithm for implementing methods of embodiments of the present invention. The processor 191 executes the computer code 197. The memory device 194 includes input data 196. The input data 196 includes input required by the computer code 197. The output device 193 displays output from the computer code 197. Either or both memory devices 194 and 195 (or one or more additional memory devices not shown in FIG. 9) may be used as a computer usable storage medium (or program storage device) having a computer readable program embodied therein and/or having other data stored therein, wherein the computer readable program includes the computer code 197. Generally, a computer program product (or, alternatively, an article of manufacture) of the computer system 190 may include the computer usable storage medium (or said program storage device).

The processor 191 may represent one or more processors. The memory device 194 and/or the memory device 195 may represent one or more computer readable hardware storage devices and/or one or more memories.

Thus embodiments of the present invention discloses a process for supporting, deploying and/or integrating computer infrastructure, integrating, hosting, maintaining, and deploying computer-readable code into the computer system 190, wherein the code in combination with the computer system 190 is capable of implementing the methods of embodiments of the present invention.

While FIG. 9 shows the computer system 190 as a particular configuration of hardware and software, any configuration of hardware and software, as would be known to a person of ordinary skill in the art, may be utilized for the purposes stated supra in conjunction with the particular computer system 190 of FIG. 9. For example, the memory devices 194 and 195 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of embodiments may include one or more computer readable hardware storage devices having computer readable program code stored therein, said program code containing instructions executable by one or more processors of a computing system (or computer system) to implement the methods of the present invention.

A computing system (or computer system) of embodiments may include one or more processors, one or more memories, and one or more computer readable hardware storage devices, said one or more hardware storage devices containing program code executable by the one or more processors via the one or more memories to implement the methods of embodiments.

In embodiments, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

In embodiments, predicting resource availability in a given time period by leveraging profile data may be implemented using special purpose algorithms. For example, a special purpose algorithm may be implemented to analyze historical user of a resource, determine that factors are predictors of use of the resource by users, and/or predicting that there is a statistical likelihood that one or more users will use the resource during a given time period.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by one or more processors of predicting resource availability in a given time period by leveraging profile data associated with one or more users in a venue, said method comprising:
   receiving, from an other user that entered the venue, a request to use one resource of a plurality of resources provided by the venue, said request being received while each user of the one or more users in the venue is using a respective resource of the plurality of resources and is watching a broadcasted sporting event provided in the venue, each resource of the plurality of resources configured to provide a same type of usage to users who use each resource; and
   in response to said receiving the request, determining that the one resource is not currently available;
   in response to said determining that the one resource is not currently available, determining an optimized wait time for use of the one resource by the other user and assigning the optimized wait time to the other user for use of the one resource, said optimized wait time being an optimized estimate of a time interval from a current time to a future time when the one resource will be available to the other user, said determining and assigning the optimized wait time comprising:
   analyzing historical information to determine historical use of the plurality of resources in the venue by the one or more users, said analyzing historical information comprising analyzing historical data included in records respectively associated with each user of the one or more users;
   acquiring, by performing video analysis of the venue, patterns of resource usage of the plurality of resources by the one or more users in the venue;
   acquiring, by performing video analysis of the venue, one or more attribute values of the venue, said attribute values pertaining to a pattern of television broadcast screens historically near the resource being used by each user of the one or more users in the venue;
   determining, based on the historical use of the plurality of resources by the one or more users determined from said analyzing, that one or more factors are likely predictors of additional time periods of use of the respective resource by the one or more users, said one or more factors comprising the patterns of resource usage acquired by video analysis of the venue and the one or more attribute values acquired by video analysis of the venue;
   predicting, based on the one or more factors, a statistical likelihood that the one or more users will use the respective resources for the additional time periods; and
   sending, to the venue, a notification of the predicted statistical likelihood that the one or more users will use the respective resources for the additional time periods;
   determining, from the predicted statistical likelihood, the optimized wait time; and
   assigning the optimized wait time to the other user.

2. The method of claim 1, wherein said analyzing is performed via: artificial intelligence analysis, trend analysis, financial analysis, or combinations thereof.

3. The method of claim 1, wherein the venue, in response to the notification makes one or more management decisions for the venue.

4. The method of claim 3, wherein the one or more management decisions are selected from the group consisting of:
- allocating human resources;
- advertising to the one or more users;
- adjusting pricing;
- determining which events or combinations or events to broadcast at the venue;
- determining which sporting events or combinations or sporting events to broadcast at the venue; and
- combinations thereof.

5. The method of claim 1, wherein the method is implemented at least partially in conjunction with a cloud computing system.

6. The method of claim 1, wherein said analyzing comprises aggregating metadata to build context that can be used in said predicting.

7. The method of claim 6, wherein the metadata is location related metadata.

8. The method of claim 1, wherein the venue is a restaurant or a sports bar, and wherein the resource comprises tables for seating customers in the venue.

9. A computer system comprising: a central processing unit (CPU); a memory coupled to the CPU; and a computer readable storage device coupled to the CPU, the storage device containing instructions that are executed by the CPU via the memory to implement a method of predicting resource availability in a given time period by leveraging profile data associated with one or more users in a venue, said method comprising:
- receiving from an other user that entered the venue, a request to use one resource of a plurality of resources provided by the venue, said request being received while each user of the one or more users in the venue is being monitored by a video system and is using a respective resource of the plurality of resources and is watching a broadcasted sporting event provided in the venue, each resource of the plurality of resources configured to provide a same type of usage to users who use each resource; and
- in response to said receiving the request, determining that the one resource is not currently, available;
- in response to said determining that the one resource is not currently available, determining an optimized wait time for use of the one resource by the other user and assigning the optimized wait time to the other user for use of the one resource, said optimized wait time being an optimized estimate of a time interval from a current time to a future time when the one resource will be available to the other user, said determining and assigning the optimized wait time comprising:
  - analyzing historical information to determine historical use of the plurality of resources in the venue by the one or more users, said analyzing historical information comprising analyzing historical data included in records respectively associated with each user of the one or more users;
  - acquiring, by performing video analysis of the venue, patterns of resource usage of the plurality of resources by the one or more users in the venue;
  - acquiring, by performing video analysis of the venue, one or more attribute values of the venue, said attribute values pertaining to a pattern of television broadcast screens historically near the resource being used by each user of the one or more users in the venue;
  - determining, based on the historical use of the plurality of resources by the one or more users determined from said analyzing, that one or more factors are likely predictors of additional time periods of use of the respective resource by the one or more users, said one or more factors comprising the patterns of resource usage acquired by video analysis of the venue and the one or more attribute values acquired by video analysis of the venue;
  - predicting, based on the one or more factors, a statistical likelihood that the one or more users will use the respective resources for the additional time periods; and
  - sending, to the venue, a notification of the predicted statistical likelihood that the one or more users will use the respective resources for the additional time periods;
  - determining, from the predicted statistical likelihood, the optimized wait time; and
  - assigning the optimized wait time to the other user.

10. The computer system of claim 9, wherein the venue is a restaurant or a sports bar, and wherein the resource comprises tables for seating customers in the venue.

11. A computer program product, comprising a computer readable hardware storage device having computer readable program code stored therein, said program code containing instructions executable by one or more processors of a computer system to implement a method of predicting resource availability in a given time period by leveraging profile data associated with one or more users in a venue, said method comprising:
- receiving, from an other user that entered the venue, a request to use one resource of a plurality of resources provided by the venue, said request being received while each user of the one or more users in the venue is being monitored b a video system and is using a respective resource of the plurality of resources and is watching a broadcasted sporting event provided in the venue, each resource of the plurality of resources configured to provide a same type of usage to users who use each resource; and
- in response to said receiving the request determining that e one resource is not currently available;
- in response to said determining that the one resource is not currently available, determining an optimized wait time for use of the one resource by the other user and assigning the optimized wait time to the other user for use of the one resource, said optimized wait time being an optimized estimate of a time interval from a current time to a future time when the one resource will be available to the other user, said determining and assigning the optimized wait time comprising:
  - analyzing historical information to determine historical use of the plurality of resources in the venue by the one or more users, said analyzing historical information comprising analyzing historical data included in records respectively associated with each user of the one or more users;
  - acquiring, by video analysis of the venue, patterns of resource usage of the plurality of resources by the one or more users in the venue;
  - acquiring, by video analysis of the venue, one or more attribute values of the venue, said attribute values pertaining to a pattern of television broadcast screens historically near the resource being used by each user of the one or more users in the venue;

determining, based on the historical use of the plurality of resources by the one or more users determined from said analyzing, that one or more factors are likely predictors of additional time periods of use of the respective resource by the one or more users, said one or more factors comprising the patterns of resource usage acquired by video analysis of the venue and the one or more attribute values acquired by video analysis of the venue;

predicting, based on the one or more factors, a statistical likelihood that the one or more users will use the respective resources for the additional time periods; and sending, to the venue, a notification of the predicted statistical likelihood that the one or more users will use the respective resources for the additional time periods;

determining, from the predicted statistical likelihood, the optimized wait time; and assigning the optimized wait time to the other user.

12. The computer program product of claim 11, wherein the venue is a restaurant or a sports bar, and wherein the resource comprises tables for seating customers in the venue.

* * * * *